(No Model.) 2 Sheets—Sheet 1.
H. P. HALL.
CORN PLANTER AND CHECK ROWER.
No. 254,128. Patented Feb. 28, 1882.
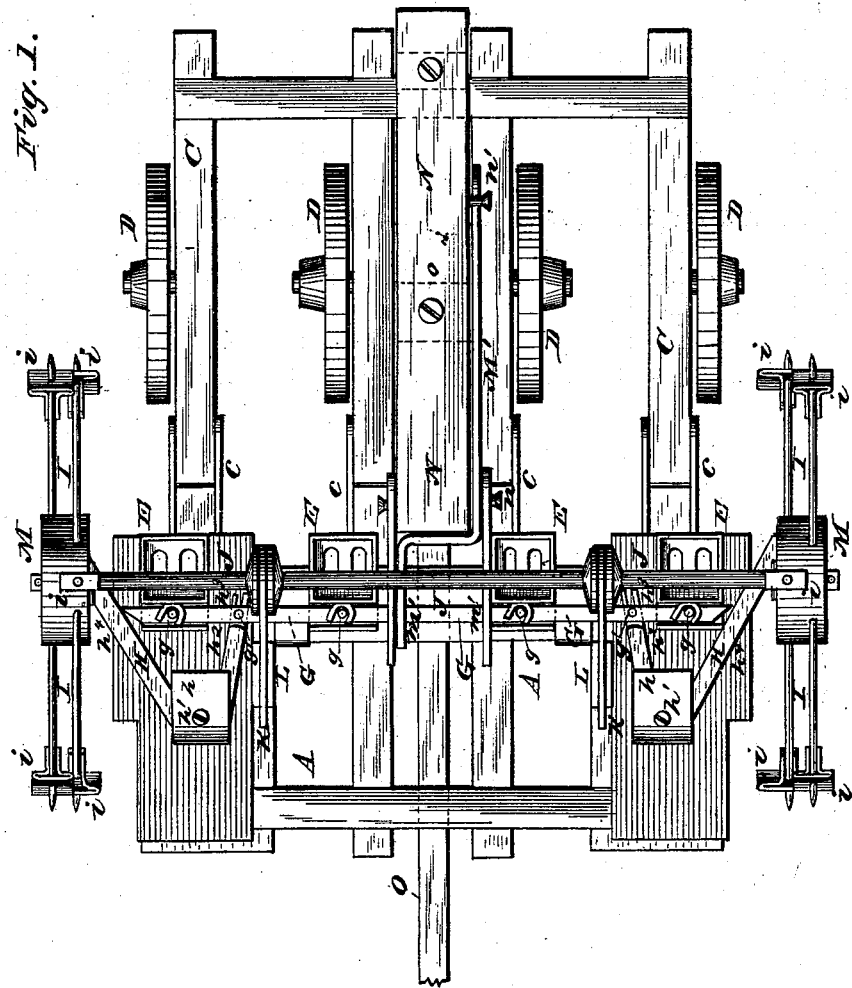
WITNESSES
INVENTOR
Henry P. Hall
per.
De Witt C. Allen, Attorney.

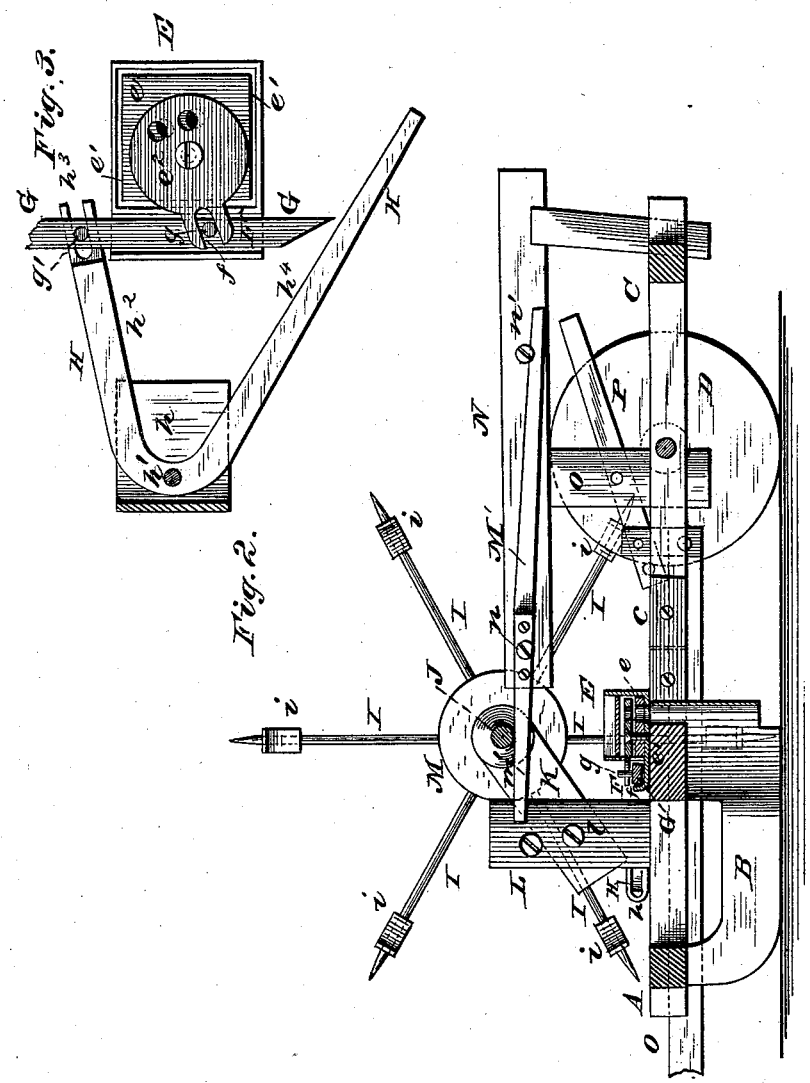

UNITED STATES PATENT OFFICE.

HENRY P. HALL, OF DANVERS, ILLINOIS.

CORN-PLANTER AND CHECK-ROWER.

SPECIFICATION forming part of Letters Patent No. 254,128, dated February 28, 1882.

Application filed July 28, 1881. (No model.)

*To all whom it may concern:*

Be it known that I, HENRY P. HALL, a citizen of the United States, residing at Danvers, in the county of McLean and State of Illinois, have invented certain new and useful Improvements in Corn-Planters and Check-Rowers; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to certain new and useful improvements in corn-planters and check-rowers, and more particularly to improvements in the class of machines adapted to plant four hills of four parallel rows at a time; and the invention consists in novel features of construction and combination and arrangement of parts, all as will be hereinafter fully described, and specifically designated in the claims.

Referring to the accompanying drawings, Figure 1 represents a top view or plan of my improved machine; Fig. 2, a longitudinal vertical section of the same; Fig. 3, a detailed sectional view, to be hereinafter referred to.

In the drawings, A represents the front frame of the machine, mounted upon the four runners B, and C the rear frame of the machine, mounted upon the four wheels D, said frames A C being flexibly connected together by hinged or pivoted connections $c$.

The runner-frame A is provided at its rear end with four seed or corn boxes, E, arranged equidistant apart, and each of said boxes is provided with a double bottom, $e$ $e'$, between which is arranged the horizontal pivoted and oscillating dropping-plate $e^2$, having two openings through it for alternately receiving the seed or corn passing through the two openings in the upper bottom, $e$, of the seed-box, and alternately discharging it through the single opening in the lower bottom, $e'$, of the seed-box into the discharge-tube at the heel of the runner.

Each of these dropping-plates $e^2$ is provided with an arm, F, projecting through the side of the seed-box, and having a forked end, $f$, that engages or embraces a vertical stud $g$, on the transverse dropping-bar G.

H H represent two bent or elbow levers, arranged upon the runner-frame A, near the sides thereof. The bent or elbow portion of each of said levers is inserted in a metallic cap, $h$, through which and the lever passes a screw or pin, $h'$, by which they are pivotally connected to the frame, said cap $h$ forming washers for said lever while protecting the pivotal point of the lever.

The short arm $h^2$ of each of the levers H is provided with a forked end, $h^3$, adapted to engage or embrace a downwardly-projecting lug, $g'$, on the under side of the dropping-bar, while the longer arms $h^4$ of said levers project beyond the sides of the machine, so as to be alternately operated by the marking-arms I, as hereinafter described.

J represents a transverse shaft, loosely journaled or mounted in the upper ends of the arms K K, which have their lower ends loosely mounted upon one of the transverse pins or rods $l$ connecting the uprights L. This shaft J has rigidly secured upon the ends thereof metallic hubs M M, each provided with two circumferential rows of radially-projecting arms, I, arranged near the inner and outer ends thereof, and the arms of one row arranged to alternate with the arms of the other row, and in such manner that the arms of the inner row of each hub alternate with each other, but come on a transverse line with the outer row of arms on the other hub, whereby the arms of the outer row of each hub will respectively check or mark with the arms of the inner row of the opposite hub that alternately engage the bent or elbow levers H H, that operate the dropping-bar. The outer row of arms of each hub do not touch the levers H H, but are used merely for making corresponding marks on opposite sides of the machine, to correspond or come on a line with the alternating marks made by the inner rows of arms that alternately operate said levers, thus checking or marking on both sides of the machine the hills planted at each movement of the dropping-bar.

To make the machine check accurately it is essential that the corresponding marking-arms on both hubs be made to stand and work in the same vertical line, and said arms must therefore be set mechanically correct in the hub, so that the distance between the ends of any two neighboring arms must be the distance between any other two neighboring arms, and that distance is the distance between the rows.

On the end of each arm is attached a metal foot, $i$, having a metallic pin projecting from the center, and said foot is of sufficient size to prevent the arms from sinking too deeply into the ground, and also marks sufficiently large to drive by in the next turn of the machine across the field.

M' represents a lever, pivoted at $n$ to the forward extension of the seat N, and having a bifurcated end, $m'$, which is used to lift the marking-arms out of the ground by engaging and raising the transverse shaft J, as shown in Fig. 2, and in which position they are held by the rear end of the lever being depressed below and engaging a pin, $n'$, projecting from the side of the seat.

By changing the fulcrum of the arms K K on the pins or rods $l$ $l$ the adjustment of the shaft carrying the hubs and marking-arms can be varied to regulate the depth the arms penetrate the ground, and for changing the height to which they may be raised in order to clear the ground when the machine is not in operation.

O represents a beam connected to and projecting in rear of the runner-frame, and the rear end of said beam is provided with two uprights, $o$ $o$, through which passes a pin, upon which is fulcrumed the front end of a lever, P, said lever being depressed by the foot of the operator when it is desired to raise the rear end of the runner-frame in order to allow the machine to readily pass over obstructions.

My improvements can be readily attached to any of the usual forms of corn-planters.

The operation of my improved machine is as follows: When the machine is being drawn across the field the arms of the inner rows on the hubs will alternately operate the levers H H, thus reciprocating the dropping-bar G, and which, being connected to the dropping-plates, as before described, will oscillate them, and thus drop the seed or corn into the discharge-tubes at the heels of the runners at each forward and return movement of the dropping-bar, while the two rows of arms on each hub will also check or mark off on each side of the machine, exactly in line with the dropped seed or corn, thus accurately checking or marking the field in rows already planted, so that the operator is enabled at all times to commence where he left off planting.

Having thus fully described my invention, what I claim as new, and desire to secure by Letters Patent, is—

1. In a check-rower corn-planter, the combination, with the shaft J, of the hubs M M, mounted on the ends thereof, and each hub provided with two rows of radially-projecting marking-arms, I, the arms of said rows alternating with each other, as shown, whereby the inner row of arms on each hub will come on a line with the outer row of arms on the other hub, the dropping-bar and operating mechanism adapted to be alternately operated by the inner row of arms on the hubs, substantially in the manner as and for the purpose herein shown and described.

2. In a check-rower corn-planter, the combination, with the dropping-bar G, of the pivoted bent or elbow levers H H, connected to said bar by the short arms $h^2$ $h^2$, with their long arms $h^4$ $h^4$ projecting beyond the sides of the machine, and the shaft J, having hubs provided with rows of arms I I, adapted to alternately engage the long arms $h^4$ $h^4$ of said levers for operating the dropping-bar, substantially in the manner as and for the purpose herein shown and described.

3. In a check-rower corn-planter, the combination of the dropping-plates having forked arms F, the dropping-bar G, provided with the studs $g$ $g$ and $g'$ $g'$, pivoted bent or elbow levers H H, having short forked arms $h^2$ $h^2$ and long arms $h^4$ $h^4$ projecting beyond the sides of the machine, and the shaft J, provided with hubs M M, each hub having two rows of marking-arms, the several parts arranged and operating substantially in the manner herein shown and described.

4. The combination, with the bent or elbow levers H H, of the metallic caps $h$ $h$, in which the bent or elbow portions of said levers are arranged, and a screw, pin, or its equivalent, passing through each cap and lever, by which they are pivoted upon the frame of the machine, substantially in the manner as and for the purpose herein shown and described.

In testimony whereof I affix my signature in presence of two witnesses.

HENRY P. HALL.

Witnesses:
S. P. SHANNON,
W. M. HATCH.